United States Patent [19]

Mahl

[11] Patent Number: 4,929,116
[45] Date of Patent: May 29, 1990

[54] COUPLER ASSEMBLY FOR CONNECTING CORRUGATED SHEET MATERIAL

[75] Inventor: Robert R. Mahl, Cincinnati, Ohio

[73] Assignee: Chesapeake Display and Packaging Company, Winston-Salem, N.C.

[21] Appl. No.: 175,960

[22] Filed: Mar. 31, 1988

[51] Int. Cl.$^5$ ............................................. F16B 9/02
[52] U.S. Cl. ................................... 403/263; 108/108;
248/250; 248/225.1; 403/353; 403/199;
403/232.1
[58] Field of Search ...................... 108/107, 108, 109;
248/242, 250, 224.4, 225.1, 224.3; 403/199, 263,
232.1, 240, 253, 353; 24/458

[56] References Cited

U.S. PATENT DOCUMENTS

| | | |
|---|---|---|
| 145,455 | 12/1873 | Solliday . |
| 2,103,106 | 12/1957 | Yurkovitch . |
| 3,511,525 | 5/1970 | Friedling et al. . |
| 4,142,809 | 3/1979 | Shell ..................................... 403/201 |
| 4,314,685 | 2/1982 | Schwan ................................ 108/107 |
| 4,389,133 | 6/1983 | Oberst . |
| 4,565,465 | 1/1986 | Oberst . |
| 4,671,417 | 6/1987 | O'Brien . |

Primary Examiner—Randolph A. Reese
Assistant Examiner—Carol I. Bordas
Attorney, Agent, or Firm—Bell, Seltzer, Park & Gibson

[57] ABSTRACT

A coupler assembly is disclosed which is adapted for interconnecting pieces of corrugated sheet material and includes a female member having a back wall and receiving portion mounted on one side of the back wall. A male connecting member couples to the female member and includes front and rear flanges, with the rear flange dimensioned to rotatably fit within the receiving portion, and so that the members may be connected in a selected rotational orientation. A hub interconnects the flanges and a flat planar tab is joined to the side of the front flange opposite the hub for insertion within corrugated sheet material.

6 Claims, 1 Drawing Sheet

U.S. Patent  May 29, 1990  4,929,116
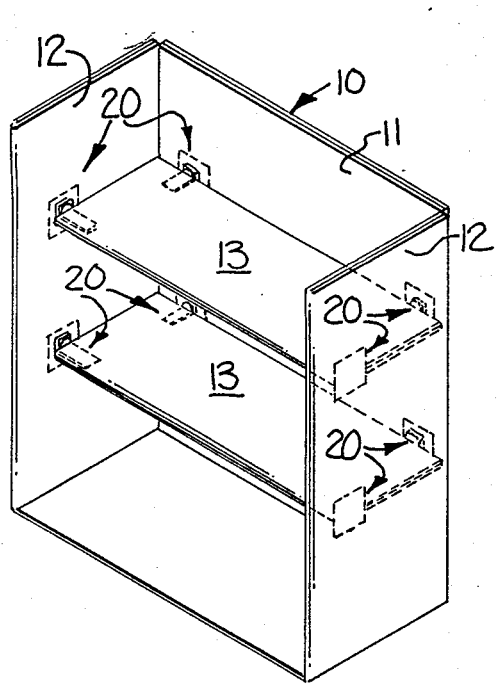
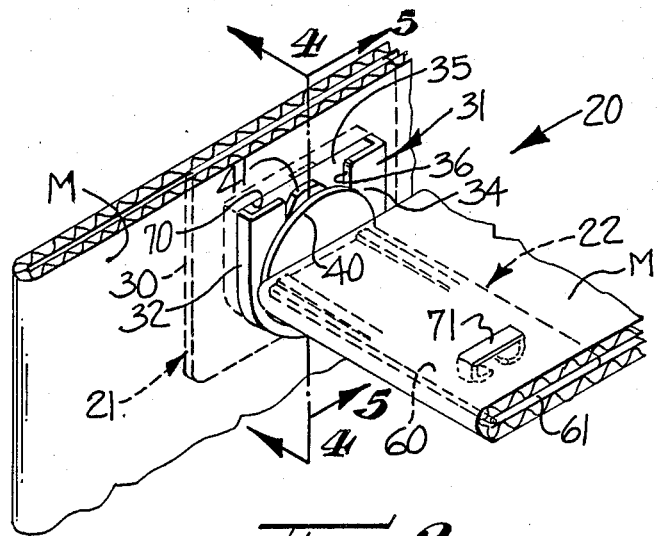
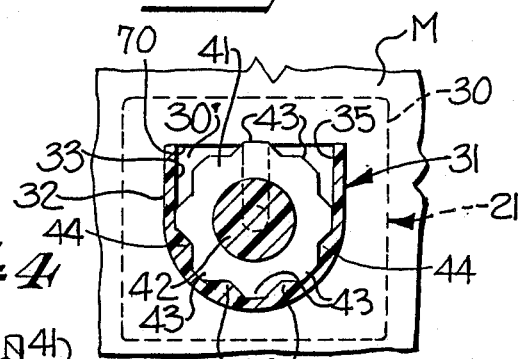
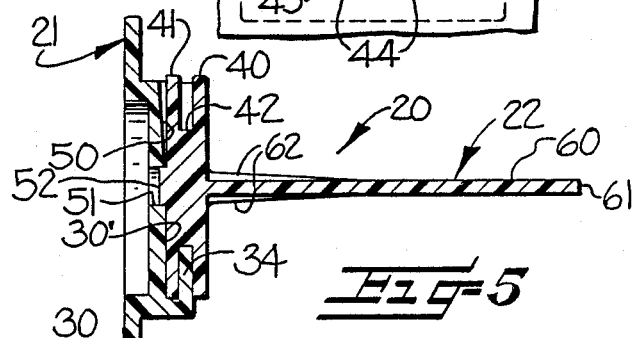
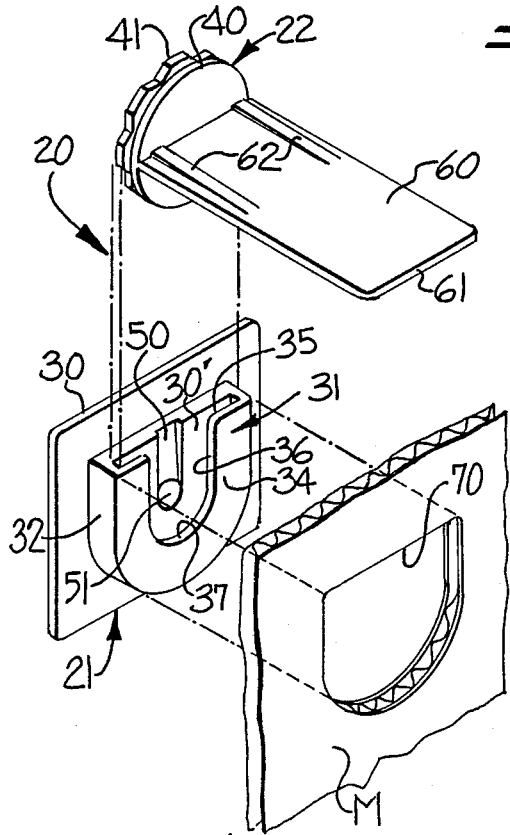
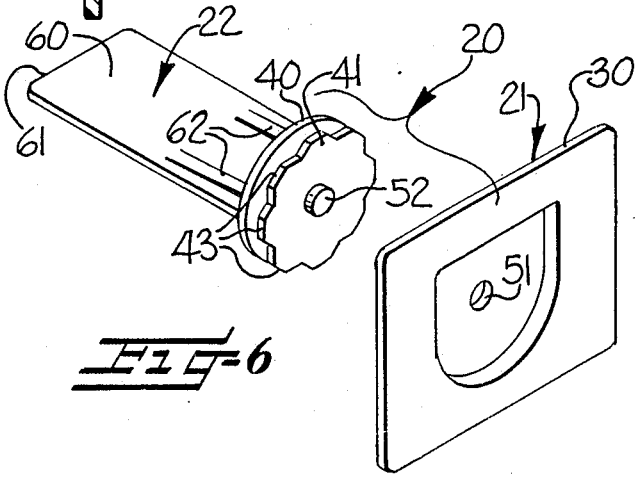

COUPLER ASSEMBLY FOR CONNECTING CORRUGATED SHEET MATERIAL

This invention relates to connectors used to interconnect corrugated sheet material and more particularly to assemblies having cooperating members which interconnect adjacent corrugated sheet panels such as used in point-of-purchase advertising displays.

BACKGROUND OF THE INVENTION

Since the cost of plastics and other materials have risen sharply in recent years, corrugated sheet material has been found to be an inexpensive and reliable substitute for the plastics and other materials that previously had been used with point-of-purchase advertising displays and other simple shelf arrangements. Often the corrugated sheet material is precut, prefolded and packed into unassembled point-of-purchase display units. This allows a retailer to quickly unpack and assemble a display for immediate retail use.

To make assembly easier and to add rigidity and strength which adhesives cannot supply, various connectors and brackets have been devised which engage each other as well as support the corrugated sheet material. A popular type of connector assembly has cooperating male and female members as well as flat backings or tabs positioned on each male and female member for insertion within the corrugated sheet material. As disclosed in U.S. Pat. Nos. 4,389,133 and 4,565,465 to Oberst, these types of connector assemblies are adapted to interconnect pieces of corrugated sheet material and add strength and rigidity to a display. During assembly of the unassembled display, the backings or tabs may be positioned within the corrugated sheet material to provide for the quick assembly of a prepacked, unassembled corrugated display.

It is believed that the prior art coupler assemblies of the described type have not provided for the flexibility that retailers often desire. For example, depending on the type of product displayed, a retailer may desire the shelf within a display to sit at an askew negative angle to prevent objects from sliding off the shelves. On the other hand, if a display case hangs at an askew angle, the shelves must be angled relative to the display case to provide level shelf space. Such flexibility of orientation is not readily possible with the known coupler assemblies.

It is therefore a principal object of the present invention to provide a coupler assembly for interconnecting pieces of corrugated sheet material wherein the joined pieces may be positioned at various angles relative to each other.

It is a further object of the present invention to provide a coupler assembly having interlocking male and female members for interconnecting pieces of corrugated sheet material.

It is another object of the present invention to provide a coupler assembly having interlocking male and female members for interconnecting pieces of corrugated sheet material wherein the male and female members can be easily disengaged.

It is another object of the present invention to provide a coupler assembly having interlocking male and female members wherein each member includes a portion adapted for insertion into corrugated sheet material.

SUMMARY OF THE INVENTION

These and other objects and advantages of the present invention are accomplished by a coupler assembly which is adapted for interconnecting pieces of corrugated sheet material or the like to form point-of-purchase advertising displays. The coupler assembly is characterized by the ability to permit the pieces to be interconnected in a selected rotational orientation.

The coupler assembly of the present invention comprises a female connecting member which includes a generally planar back wall, and a receiving portion mounted on one side of the back wall. The receiving portion has a generally U-shaped side wall extending outwardly from the back wall and a front wall joined to the U-shaped side wall so as to be parallel to the back wall and define a receiving pocket between the front wall and the back wall which is bounded by the side wall and open at the top. A slot is included in the front wall which extends from the top of the pocket to a slot terminus at a medial location on the front wall.

The coupler assembly also includes a male connecting member having a pair of front and rear flanges and a hub defining a central axis and extending between and interconnecting the flanges in an axially spaced apart and parallel relationship which is transverse to the central axis. The axial separation between the flanges is at least about the thickness of the front wall. The rear flange is dimensioned to rotatably fit within the pocket and the hub is dimensioned to rotatably fit within the slot. A flat planar tab is joined to the side of the front flange opposite the hub and extends parallel to the central axis.

In operation, the male connecting member can be releasably coupled to the female connecting member. The male connecting member also can be coupled in substantially any rotational orientation about the central axis by sliding the rear flange laterally into the pocket to an assembled position so that the rear flange is substantially completely received into the pocket, and the front flange overlies the side of the front wall opposite the pocket and the hub is received into the slot adjacent the slot terminus.

In the preferred embodiment, the U-shaped side wall includes a generally semi-circular inner surface facing the interior of the pocket. The rear flange has a generally circular outline of a diameter somewhat less than the diameter of the semi-circular inner surface. A plurality of saw tooth like projections are spaced along the circumferential periphery of the rear flange, and at least one protuberance is included on the inner surface of the side wall for engaging between selected projections when the members are in an assembled position, to thereby prevent relative rotation between the members about the central axis when the members are in the assembled position.

BRIEF DESCRIPTION OF THE DRAWINGS

Some of the objects and advantages of the present invention having been stated, others will be more fully understood by reference to the following drawings, in which FIG. 1 is a perspective view of a point-of-purchase advertising display having shelves secured in the display by the coupler assembly.

FIG. 2 is a fragmentary perspective view of the coupler assembly having male and female connecting members inserted within corrugated sheet material.

FIG. 3 is an exploded perspective view of the coupler assembly showing the insertion of the female connecting member within a sheet of corrugated material.

FIG. 4 is a sectional view of the coupler assembly taken along line 4—4 of FIG. 2 and showing the locking engagement between the male and female connecting members.

FIG. 5 is a sectional view of the coupler assembly taken along line 5—5 of FIG. 2.

FIG. 6 is an exploded perspective view of the coupler assembly taken from a direction opposite that of FIG. 3.

DETAILED DESCRIPTION OF THE PREFERRED EMBODIMENT

Referring more particularly to the drawings, one preferred embodiment of the invention is shown in FIG. 1 wherein a point-of-purchase advertising display 10 of conventional design is fabricated from corrugated sheet material M. The display 10 has a back 11 and side walls 12 with display shelves 13 coupled to the back 11 and side walls 12 by the coupler assembly designated generally at 20.

In accordance with the illustrated embodiment of the present invention, the coupler assembly 20 includes a female connecting member 21 which couples with a male connecting member 22 (FIGS. 2 and 3) in a selected rotational orientation. The members 21 and 22 may each be molded from a suitable plastic material. The female connecting member 21 has a generally planar back wall 30 of rectangular outline, and a receiving portion 31 mounted on the back wall 30. The receiving portion 31 includes a generally U-shaped side wall 32 which extends outwardly from the back wall 30 to define a generally semicircular inner surface 33. A front wall 34 is joined to the U-shaped side wall 32 and lies parallel to the back wall 30. Also, the back wall 30 includes a raised back wall portion 30', which is positioned within the boundary of the side wall 32. The side wall 32, front wall 34 and back wall portion 30' define a receiving pocket 35 between the front wall 34 and the back wall portion 30' which is bounded by the side wall 32 and open at the top. Included in the front wall 34 is a slot 36 which extends from the top of the receiving pocket 35 to a generally semi-circular shaped slot terminus 37 at a medial location on the front wall 34.

The male connector 22 includes a pair of front and rear flanges 40, 41 which are interconnected by a cylindrical hub 42 so as to define a central axis and position the flanges 40, 41 in an axially, spaced apart and parallel relationship which is transverse to the central axis. In the illustrated preferred embodiment, both the flanges 40, 41 have a generally circular outline of substantially similar diameter to each other with the rear flange 41 having a diameter somewhat less than the diameter of the semicircular inner surface 33 of the receiving pocket 35 so that the rear flange 41 may rotatably fit within the receiving pocket 35. The hub 42 is dimensioned to rotatably fit within the receiving slot 36 while the axial separation between the front and rear flanges 40, 41 is at least about, and preferably slightly greater than the thickness of the front wall 34 of the receiving portion 31 (FIG. 5).

Spaced along the circumferential periphery of the rear flange 41 are a plurality of saw tooth like projections 43. Positioned on the inner surface 33 of the side wall 32 of receiving pocket 35 are four circumferentially spaced protuberances 44 which engage between the saw tooth like projections 43 when the rear flange 41 is inserted within the receiving pocket 35 (FIG. 4). When the male and female connecting members 21, 22 are coupled together in an assembled position as shown in FIG. 2, interengagement of the saw tooth like projections 43 and the protuberances 44 resist rotation of the male connecting member 22 about its central axis. For resisting separation of the male and female connecting members 21, 22 when they are coupled together in the assembled position, an inclined cam surface 50 and opening 51 is provided on the back wall portion 30' of the female connector 21 (FIG. 3) and which engage an extension 52 which is positioned on the rear flange 41 of the male connecting member 22 opposite the front flange 40 (FIG. 6), and aligned on the central axis. The inclined cam surface 50 extends in alignment with the slot 36 from the top of the slot 36 to the opening 51 in the back wall portion 30'. The opening 51 is sized and positioned to receive the extension 52 when the male and female connecting members 21, 22 are in the assembled position. During assembly of the male connecting member 22 into the female connecting member 21 the extension 52 is cammed into the opening 51 during the movement of the rear flange 41 toward the final assembled position, and a substantial force is required to effect withdrawal.

For joining the male connecting member 22 to corrugated sheet material M, a flat, planar tab 60 of generally rectangular outline is joined to the side of the front flange 40 opposite the hub 42 and so as to extend along the central axis of the hub 42. The tab 60 has a width substantially the same as the diameter of the front flange 40 and defines a free end edge 61 remote from the front flange 40. Each face of the tab 60 also includes thereon two longitudinally extending inclined projections 62, with the inclined projections 62, being inclined so as to increase in thickness in the direction leading from the free end edge 61 to the front flange 40.

In actual use, the back wall 30 of the female connecting member 21 is inserted between sheets of corrugated material M such as the side walls 12 of a point-of-purchase advertising display 10. One sheet of the corrugated sheet material M includes a cut-out 70 for allowing the receiving portion 31 to extend therethrough (FIG. 3). The flat planar tab 60 of the male connecting member 22 also is inserted between sheets of corrugated material used as a shelf 13 for the point-of-purchase advertising display 10. Although any conventional adhesive may be used to hold the tab 60 between the corrugated sheet material M, a staple 71 is preferred since stapling is a quick and inexpensive means to hold the tab 60 to the corrugated sheet material M. Once assembled, the projections 62 on the tab 60 serve to engage the sheets and resist lateral movement.

In its final assembly, the male connecting member 22 with the shelf 13 attached thereto, is coupled to the female connecting member 21 which is inserted within the side wall 12 of the point-of-purchase display 10. Before the rear flange 41 of the male connecting member 22 is locked into place within the receiving pocket 31, the shelf angle may be adjusted to a desired position. It is understood that the number of positions to which the male connecting member 22 can be angled relative to the female connecting member 21 is dependent upon the number of saw tooth like projections 43 spaced along the circumferential periphery of the rear flange 41 as well as the size of the protuberances 44 positioned on the side wall 32 of the receiving portion 31. For shelves 13 that are especially wide or which will carry heavy objects, couplers 20 also may be used on the back wall 11 as illustrated in FIG. 1. Although the addition of couplers 20 to the back wall 11 will add strength to the shelves 13, the added couplers 20 limit the amount of selected angular movement of the shelf 13.

The foregoing embodiment is to be considered illustrative rather than restrictive of the invention and those modifications which come within the meaning and range of equivalents of the claims are to be included therein.

That which is claimed is:

1. A coupler assembly adapted for interconnecting pieces of corrugated sheet material or the like to form point of purchase advertising displays, and characterized by the ability to permit the pieces to be interconnected in a selected rotational orientation, said coupler assembly comprising a female connecting member including a generally planar back wall, and a receiving portion mounted on one side of said back wall and comprising a generally U-shaped side wall extending outwardly from said back wall, and a front wall joined to said U-shaped side wall so as to be parallel to said front wall and said back wall which is bounded by said side wall and open at the top, said back wall including a back wall portion positioned so as to define the rear surface of said pocket, an opening positioned in said back wall portion within the area bounded by said receiving pocket, and a slot in said front wall which extends from said top of said pocket to a slot terminus at a medial location on said front wall, and a male connecting member comprising a pair of front and rear flanges, and a hub defining a central axis and extending between and interconnecting said flanges in an axially spaced apart and parallel relationship which is transverse to said central axis, with the axial separation being at least about the thickness of said front wall, and with said rear flange being dimensioned to rotatably fit within said pocket and with said hub dimensioned to rotatably fit within said slot, an extension on the side of said rear flange opposite said front flange and aligned along said central axis and sized and positioned so that said extension is received into said opening positioned on said back wall portion when said members are in an assembled position, and a flat planar tab joined to the side of said front flange opposite said hub and extending parallel to said central axis, whereby said male connecting member can be releasably coupled to said female connecting member with said male connecting member in substantially any rotational orientation about said central axis by sliding said rear flange laterally into said pocket to an assembled position wherein said rear flange is substantially completely received in said pocket, said front flange overlies the side of said front wall opposite said pocket, and said hub is received in said slot adjacent said slot terminus.

2. The coupler assembly as defined in claim 1 wherein said male and female connecting members include interengaging means for resisting rotation of said male connecting member about said central axis when said members are in said assembled position.

3. The coupler assembly as defined in claim 2 wherein said U-shaped side wall includes a generally semicircular inner surface facing the interior of said pocket, and wherein said rear flange has a generally circular outline of a diameter somewhat less than the diameter of said semi-circular inner surface.

4. The coupler assembly as defined in claim 3 wherein said interengaging means comprises a plurality of sawtooth like projections spaced along the circumferential periphery of said rear flange, and at least one protuberance on said inner surface of said side wall for engaging between selected projections when said members are in said assembled position.

5. The coupler assembly as defined in claim 1 wherein said back wall portion includes an inclined cam surface extending in alignment with said slot and from the top of said pocket to said opening in said back wall, for camming said extension into said opening during movement of said rear flange toward said assembled position.

6. A coupler assembly adapted for interconnecting pieces of corrugated sheet material or the like to form point of purchase advertising displays, and characterized by the ability to permit the pieces to be interconnected in a selected rotational orientation, said coupler assembly comprising a female connecting member including a generally planar back wall, and a receiving portion mounted on one side of said back wall and comprising a generally U-shaped side wall extending outwardly from said back wall, and a front wall joined to said U-shaped side wall so as to be parallel to said front wall and said back wall which is bounded by said side wall and open at the top, and a slot in said front wall which extends from said top of said pocket to a slot terminus at a medial location on said front wall, and a male connecting member comprising a pair of front and rear flanges of generally circular outline, and a hub defining a central axis and extending between and interconnecting said flanges in an axially spaced apart and parallel relationship which is transverse to said central axis, with said front and rear flanges being aligned along said central axis, and with the axial separation of said flanges being at least about the thickness of said front wall, and with said rear flange being dimensioned to rotatably fit within said pocket and with said hub dimensioned to rotatably fit within said slot, said front flange having a diameter substantially the same as the diameter of said rear flange, and a flat planar tab joined to the side of said front flange opposite said hub and extending parallel to said central axis and extending along said central axis, said tab having a width substantially the same as the diameter of said front flange, said tab being of generally rectangular outline and defining a free end edge remote from said front flange, and wherein said tab includes at least one longitudinally extending inclined projection, and with the inclined projection being inclined so as to increase in thickness in the direction leading from the free end edge to the front flange, whereby said male connecting member can be releasably coupled to said female connecting member with said male connecting member in substantially any rotational orientation about said central axis by sliding said rear flange laterally into said pocket to an assembled position wherein said rear flange is substantially completely received in said pocket, said front flange overlies the side of said front wall opposite said pocket, and said hub is received in said slot adjacent said slot terminus.

* * * * *